(12) United States Patent
Hawkins

(10) Patent No.: US 6,679,461 B1
(45) Date of Patent: Jan. 20, 2004

(54) MOUNTING DEVICE

(75) Inventor: Patrick A. Hawkins, Plymouth, MN (US)

(73) Assignee: Pipe Pier, Plymouth, MN (US)

( * ) Notice: Subject to any disclaimer, the term of this patent is extended or adjusted under 35 U.S.C. 154(b) by 27 days.

(21) Appl. No.: 09/843,054

(22) Filed: Apr. 26, 2001

(51) Int. Cl.[7] .............................................. F16L 3/00
(52) U.S. Cl. ................ 248/74.2; 248/903; 248/346.5; 248/346.01; 248/68.1
(58) Field of Search .............................. 248/74.2, 903, 248/346.5, 346.01, 68.1; 52/480, 403.1, 710

(56) References Cited

U.S. PATENT DOCUMENTS

| | | | |
|---|---|---|---|
| 1,756,174 A | 4/1930 | Bosco | |
| 1,945,332 A | 1/1934 | Robinson | 16/94 |
| 2,909,054 A | 10/1959 | Phillips | 72/105 |
| 3,298,644 A | 1/1967 | Sherburne | 248/55 |
| 3,390,854 A | 7/1968 | Sherburne | 248/55 |
| 3,599,386 A | 8/1971 | LaLonde | 52/710 |
| 3,689,015 A | 9/1972 | Johnson | 248/70 |
| 3,963,205 A | 6/1976 | Hageman | 248/55 |
| 3,968,323 A | 7/1976 | Blanchet | 174/135 |
| 3,980,262 A | 9/1976 | Lee | 248/65 |
| 4,315,393 A | 2/1982 | Schack et al. | 52/710 |
| 4,344,206 A | 8/1982 | Hermanson | 16/94 R |
| 4,389,830 A | 6/1983 | Ingeberg | 52/710 |
| 4,502,653 A | 3/1985 | Curtis, Jr. | 248/55 |
| 4,516,296 A | 5/1985 | Sherman | 24/279 |
| 4,542,871 A | 9/1985 | Fortsch | 248/73 |
| 4,638,966 A | 1/1987 | Ford | 248/62 |
| 4,708,554 A | 11/1987 | Howard | 411/84 |
| 4,783,040 A | 11/1988 | Lindberg et al. | 248/74.3 |
| 4,826,113 A | 5/1989 | Winters | 248/72 |
| 4,961,553 A | 10/1990 | Todd | 248/62 |
| 5,141,186 A | 8/1992 | Cusic | 248/73 |
| 5,217,191 A | 6/1993 | Smith | 248/55 |
| D367,329 S | 2/1996 | Nelson et al. | D25/118 |
| 5,855,342 A | 1/1999 | Hawkins et al. | 248/68.1 |

OTHER PUBLICATIONS

"Aickinclamps—Adjustable Pipe Clamps", Product Information from Aickinstrut, 2 pgs (15 and 16), (Publication Date Unk).

"Cush–A–Clamp—Cushion Clamping Systems", Product Brochure from ZSi, Inc., 16 pgs, (Mar. 1996).

"Metal Framing Accessories", Product Information from Aickinstrut, 1 pg (#19), (Publication Date Unk).

"O Strut Engineering Catalog No. 92", Product Information from M–CO; a Division of Michigan Hangar Co., Inc., 56 pgs, (1987).

"Pipe Pier—Flat Roof Pipe Support System", Product Information distributed by Hawkins & Jahnke Associates, Inc., 2 pgs, (Publication Date Unk).

"Product Specification Sheet", for product DOWBK–200, from Amcon American Converters, Inc., 1 pg, (Aug. 20, 1996).

"Quick "Pipe" Block—The Labor Saver", Product Information from Nelson Olsen Inc., 2 pgs, (Publication Date Unk).

"Roof Pipestands", Product Information from Miro Industries, 4 pgs, (Publication Date Unk).

"Floating Anchor Supports", Miro Industries, Copyright 1997–2000, 1 attached drawing.*

* cited by examiner

*Primary Examiner*—Kimberly Wood
*Assistant Examiner*—Ingrid Weinhold
(74) *Attorney, Agent, or Firm*—Schwegman, Lundberg, Woessner & Kluth, P.A.

(57) ABSTRACT

A support device is provided herein and includes a support structure which has a recess therein. The support device optionally further includes a plate which has a depression therein. The plate is disposed on the support structure, where the depression of the plate is disposed at least partially within the recess of the support device. An elongate strut is disposed within the depression of the plate, where the elongate strut is coupled to the plate. A support device optionally includes support structure having a cut out or a recess therein.

17 Claims, 12 Drawing Sheets

MOUNTING DEVICE

TECHNICAL FIELD

The present invention relates generally to mounting of elongate structures. More particularly, it relates to a system for mounting structures on a surface.

BACKGROUND

In mounting elongate structures on rooftops, for instance elongate structures such as piping for plumbing, heating, ventilating, and air conditioning, several design considerations are involved, including weight of the elongate structures, and expansion and contraction of the elongate structures. Mounting systems which do not provide a secure attachment or which are not able to support the weight of heavy elongate structures, will damage the roof, and potentially cause leakage and damage to an interior of the building.

Other design considerations for mounting systems include the materials used for the mounting system. Some mounting systems are not durable are more susceptible to deterioration than others, and can only be used in mild climates. For example, snow and rain can deteriorate some mounting structures. Unprotected metal structures may rust and wood mounting structures may rot. In locations where extreme heat or humidity are common, the mounting structures may also deteriorate due to high heat, or wide changes in heat. Once the mounting structure becomes damaged, it is likely to fail to provide adequate support to an elongate structure resulting in damage to the roof.

One attempt at mounting pipes to rooftops has been to use wood mounting blocks located at spaced intervals along the pipe. The pipe is secured to the mounting block and then the entire assembly rests upon the roof. One drawback of the wood mounting bocks is that expansion and contraction of the pipes results in translation of the mounting blocks over the surface of the roof, which is likely to damage the roof. Another disadvantage is that wood mounting structures tend to rot and disintegrate, adding further possibility of damaging the roof. Additionally, different sized wood blocks may be needed for mounting on slightly irregular surfaces, so that the weight of the pipes is distributed to each wood block.

Another attempt at a pipe supporting device is described in U.S. Pat. No. 4,502,653 by Marvin R. Curtis, Jr. This structure has a flat bottom and an upwardly tapered structure with a pocket for positioning a pipe and roller positioned in a receiving trough. As the pipe expands or contracts, it rides on the roller which rotates within the trough, however, this structure does not provide a means to secure the pipe, nor does it provide for lateral motion of the pipe.

Another attempt at mounting pipes is called a QUICK "PIPE" BLOCK by Nelson-Olsen, Inc of Plymouth, Minn. The QUICK "PIPE" BLOCK is a 12"×6"×3.5" high density polyethylene block which rides on a ¾" STYROFOAM pad. A pipe is laid on the rigid block and a metal strap laid over the pipe is attached at each end by inserting fasteners into the rigid block. One disadvantage is that the block uses pre-drilled holes to receive the fasteners. If the predrilled holes do not provide adequate pipe placement the rigid block must either be drilled again or not used at all, frustrating rapid installation of piping. If the block detaches from the STYROFOAM pad, or the STYROFOAM pad deteriorates, the block may damage a roof due to repeated expansion and contraction of the piping. Another disadvantage is that different sized blocks may be needed for mounting on slightly irregular surfaces, so that the weight of the pipes is distributed to each block. This further frustrates rapid installation of piping. Another disadvantage of this system is that the holes in the rigid block limit the number and type of pipe fasteners which may be used, and the number of pipes which may be mounted to a single block are limited thereby.

Accordingly, there is a need for a mounting system which permits motion of mounted structures, and which permits mounting of relatively heavy mounted structures. What is also needed is a mounting system which protects the mounting surface from damage. The mounting system should also provide flexibility in mounting structures so that a number of mounts and mounting positions are available, especially for the mounting of more than one structure. The mounting system should provide flexibility in mounting structures on slightly irregular surfaces. The mounting system should be durable and resilient to the weather elements. The mounting system should also be relatively low cost and easy to use.

SUMMARY

A support device is provided herein and includes a support structure which has a recess therein. The support device further includes a plate which has a depression therein. The plate is disposed on the support structure, where the depression of the plate is disposed at least partially within the recess of the support device. An elongate strut is disposed within the depression of the plate, where the elongate strut is coupled to the plate.

Several options for the support device are as follows. For instant, at least one clamp is optionally coupled with the at least one elongate strut. Yet another option is that the support structure comprises foam. The elongate strut is also optionally welded to the plate. Variations of the plate are also possible. For instance, the plate optionally comprises 16 gage sheet metal. Or, the plate is defined in part by four corners, where each corner is rounded. Yet another option, includes the plate having at least one notch therein, the at least one notch disposed adjacent to the depression.

An alternative support device is also provided herein. The support device includes a foam support structure which has an elongate depression therein. The support device also includes a plastic liner disposed within the elongate depression of the support structure. The elongate depression is defined by a first profile, and the plastic liner defined by a second profile. The second profile includes an upper support surface and a lower surface. The upper support surface is adapted to receive and support a structure thereon, for example, an elongate structure such as piping.

Further options of the support device are as follows. For instance, the lower surface of the liner has a substantially similar cross-section as the elongate depression. In another option, the lower surface of the liner has a substantially different cross section as the elongate depression. In a further option, the liner has a substantially cylindrical cross-section. The elongate pipe, in another option, is slidingly received within the upper support surface.

The support device is adapted to support elongate structures which are more heavy than ordinary elongate structures, and is adapted to support heavy structures on a surface, such as a rooftop, without damage to the surface. A further benefit is that the support structure provides a visual indicator if the support structure needs to be replaced. The support structure allows for elongate structures and/or heavy structures to be mounted on slightly irregular surfaces, and is durable and resilient to harsh weather conditions. Further, the support device provides lateral mounting flexibility and support for the elongate structures and/or the heavy structure, and the elongate structures are allowed to freely change position without damaging the mounting surface, such as a rooftop membrane.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1A:
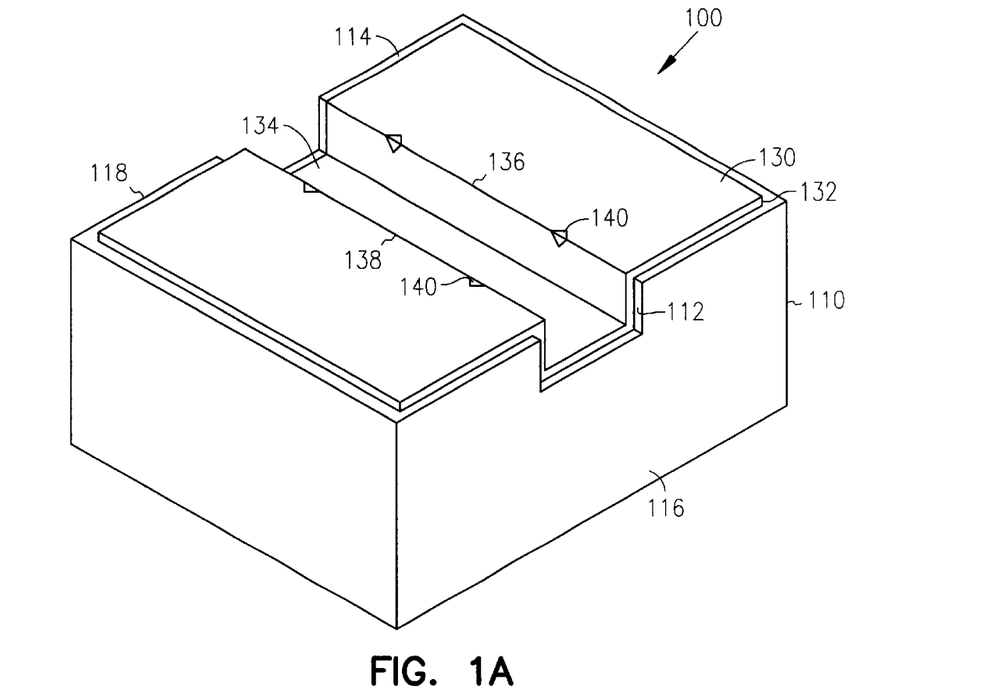
FIG. 1A is a perspective view illustrating a support device constructed in accordance with one embodiment.
Figure 1B:
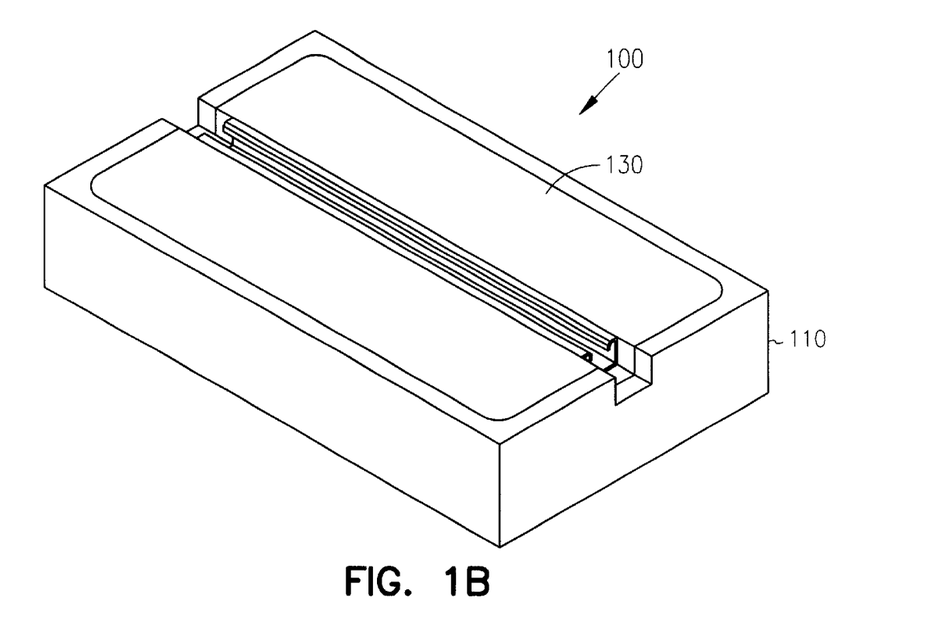
FIG. 1B is a perspective view illustrating a support device constructed in accordance with another embodiment.

FIG. 1A illustrates a perspective view of a support device 100. The support device 100 is adapted to be installed on a roof structure (FIG. 7), and is adapted to support elongate structures, such as piping. In addition, the support device 100 is adapted to support other types of equipment, such as, but not limited to, security cameras, satellite dishes, or air conditioning units. The support device 100 includes a support structure 110 which is adapted to support a plate 130 thereon, and, as further discussed below, an elongate strut is included therewith. The support device 100, in one option, has a square footprint. In another option, as shown in FIG. 1B, has a generally rectangular footprint. It should be noted that other shaped footprints, such as a circular footprint, are suitable as well.

In one embodiment, the support structure 110 is made of a pliable material, including, but not limited to, a weather resistant, pliable material. The material has, optionally, a resilience which provides a cushioning effect when compressed. In one embodiment, the support structure 110 comprises a closed cell polyethylene foam material, for example that which is marketed as Dow BK-200. In another embodiment, the support structure 110 comprises a fire retardant foam.

The recess 112 is optionally centered in a top surface 114 of the support structure 110, and comprises a structure which has, in one embodiment, a substantially square or rectangular cross-section. The support structure 110 extends from a first side 116 to a second side 118. In one option, the recess 112 extends entirely from the first side 116 to the second side 118. It should be noted however that the recess 112 optionally extends only partially from the first side 116 to the second side 118. Disposed on the support structure 110 is a plate 130.

Figure 2:
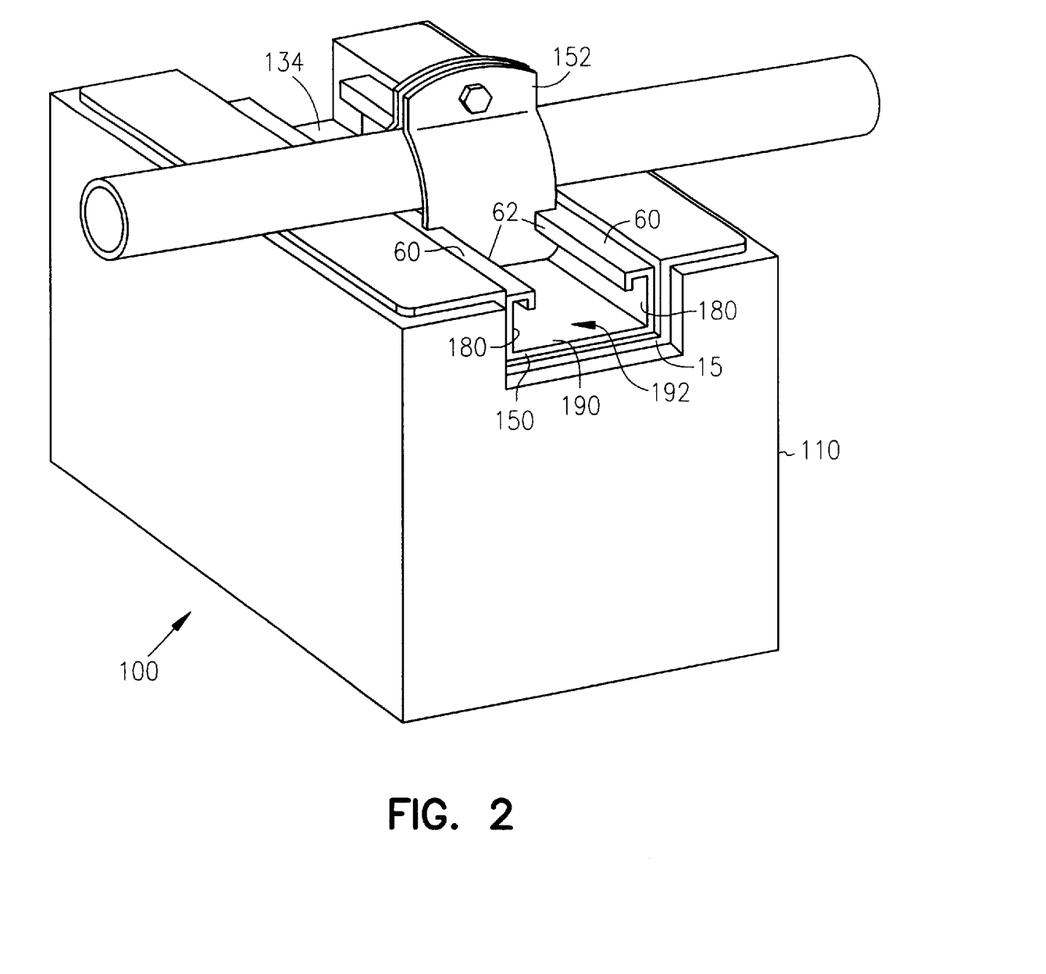
FIG. 2 is a perspective view illustrating a support device constructed in accordance with one embodiment.

The plate 130 comprises a generally flat structure, except as described below. The plate 130 is coupled with the support structure 110, in a number of manners, for instance, by adhesive or by a mechanical fastener. The plate 130 is defined in part by a footprint which is optionally substantially the same as a footprint of the support structure. In another option, the plate footprint is smaller that the support structure footprint. The plate is further defined in part by corners 132. In one option, one or more of the corners 132 is rounded. The plate further includes a depression 134 therein. The depression 134 of the plate 130 is sized and positioned to be disposed, at least partially, within the recess 112 of the support structure 110. The depression 134 is optionally deep enough to fully accept a strut therein (FIG. 2). The depression 134 is defined in part by two side edges 136, 138.

In yet another option, the plate 130 further includes one or more notches 140 therein. The notches 140 are formed in the plate 130, for example, by a break press or a hammer or heat, depending on the material of the plate 130. In another embodiment, instead of notches 140, one or more welds are formed in the plate 130. The notches 140 are optionally disposed proximate to the depression 134, for instance, on one or both side edges 136, 138. The notches 140 and/or welds beneficially assist in providing rigidity to the plate. It should be noted that variations on the notches 140 or welds including size, shape, position, which enhance rigidity are contemplated within the scope of the invention. Optionally, the plate 130 is comprised of sheet metal. One example of a suitable sheet metal is 16 gage sheet metal. Other materials for the plate 130 are suitable as well, such as, but not limited to 20 gage sheet metal, 12 gage sheet metal, 14 gage sheet metal, or plastic such as nylon, plexiglass, HDPE, or Teflon.

Referring to FIG. 2, the support device 100 further includes at least one elongate strut 150 coupled with the plate 130. In one embodiment, the at least one elongate strut 150 is spot welded to the plate 130. Other options, although the support device is not limited thereto, include coupling the strut 150 to the plate 130 with mechanical devices, and/or adhesive.

Coupled with the at least one elongate strut 150, optionally, is at least one clamp 152. The strut 150 includes a pair of opposed side walls 180 extending upward from a rear wall 190. The pair of opposed side walls 180 and the rear wall 190 define a channel 192 therein, which is adapted to receive clamps for mounting devices, such as elongate piping. The strut 150 further includes a pair of flanges 60 which extend from the side walls 180 toward one another. Each of the flanges 60 includes a lip 62 which defines an opening into the channel 192. The area defined between the side walls 180, flanges 60, and lip 62 is a recess for retaining the clamp 152 when the support devices are installed, as further described in U.S. Pat. No. 5,855,342, which is incorporated by reference herein.

The strut 150 may be of any rigid material, including, but not limited to, steel and plastic. Optionally, the strut is finished or rust proofed using paint or any other finishing or rustproofing, including, but not limited to, galvanization, anodization, hot dipping, and/or electroplating.

The at least one clamp is adapted to support an elongate structure therein or thereon. The types of clamps which can be used with the support device includes, but is not limited to, pipe claims cable clamps, electrical fittings, saddles, brackets, spring bolts, beam clamps, and roller clamps. Alternatively, the clamp comprises a bolt where the bolt head is inserted into the channel with the threaded portion exposed and a nut and plate or strap are used to compress the pipe against the upper surfaces of the flanges 60 of the strut 150.

Figure 3:
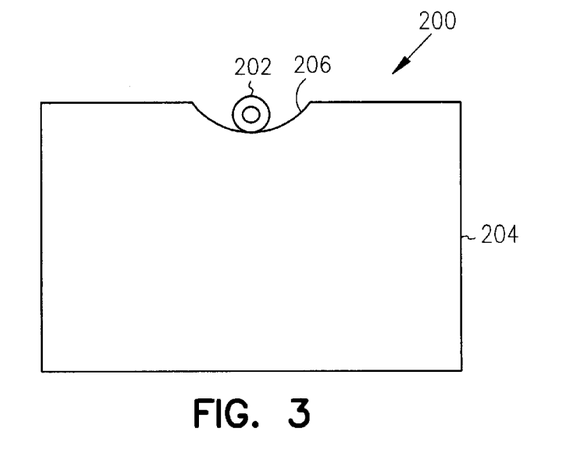
FIG. 3 is a side view illustrating a support device constructed in accordance with another embodiment.

FIG. 3 illustrates a side view of a support device 200. The support device 200 is adapted to be installed on a roof structure (FIG. 7), and is adapted to support elongate structures, such as piping 202. The support device 200 includes a support structure 204 which is adapted to support the elongate structure, such as piping 202, directly thereon. In one embodiment, the support structure 204 is made of a pliable material, including, but not limited to, a weather resistant, pliable material. The pliable material advantageously provides a visual indicator as to whether the support structure 204 has been consumed. The material has, optionally, a resilience which provides a cushioning effect when compressed. In one embodiment, the support structure 204 comprises a closed cell polyethylene foam material, for example that which is marketed as Dow BK-200. The support structure 204 includes a depression 206 therein. In another option, the material has flame retardant properties.

Figure 4A:
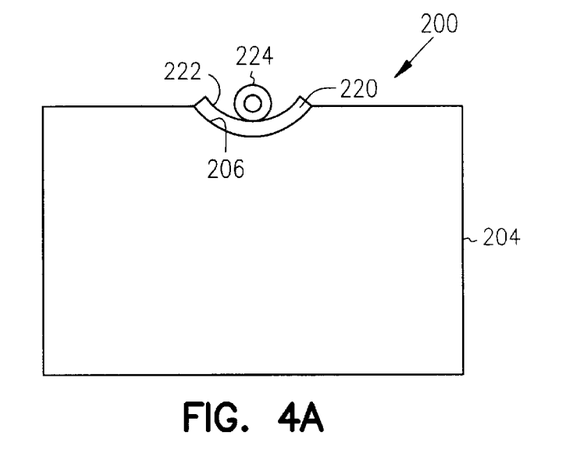
FIG. 4A is a side view illustrating a support device constructed in accordance with another embodiment.
Figure 4B:
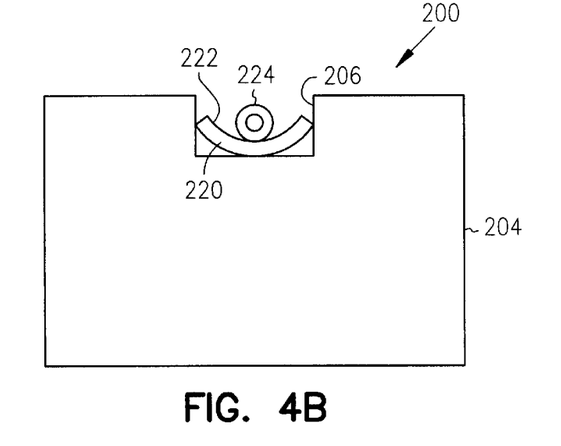
FIG. 4B is a side view illustrating a support device constructed in accordance with another embodiment.

The depression 206 is optionally centered in a top surface 208 of the support structure 204, and comprises a structure which has, in one embodiment, a substantially square or rectangular cross-section (FIG. 4B). In another option, the depression 206 has a cross-section which is semi-circular in shape.

Referring to FIGS. 4A and 4B, the support device 200 includes a liner 220 coupled therewith, where, in one option, the liner 220 is plastic. The plastic liner 220 is coupled with the support structure 204 in a number of manners, including, but not limited to, adhesive, or mechanical fastener. The plastic liner 220 is defined in part by a first profile, and the depression 206 is defined in part by a second profile. In one option, as shown in FIG. 4A, the first profile is substantially the same as the second profile. For example, the plastic liner 220 has a semi-circular cross-section and the depression 206 has a semi-circular cross-section. In another option, as shown in FIG. 4B, the first profile is different than the second profile. The plastic liner 220 includes an upper support surface 222, where the upper support surface 222 is adapted to receive and support an elongate structure 224 directly thereon. For instance, elongate piping is slidingly received within the liner 220.

Figure 5A:
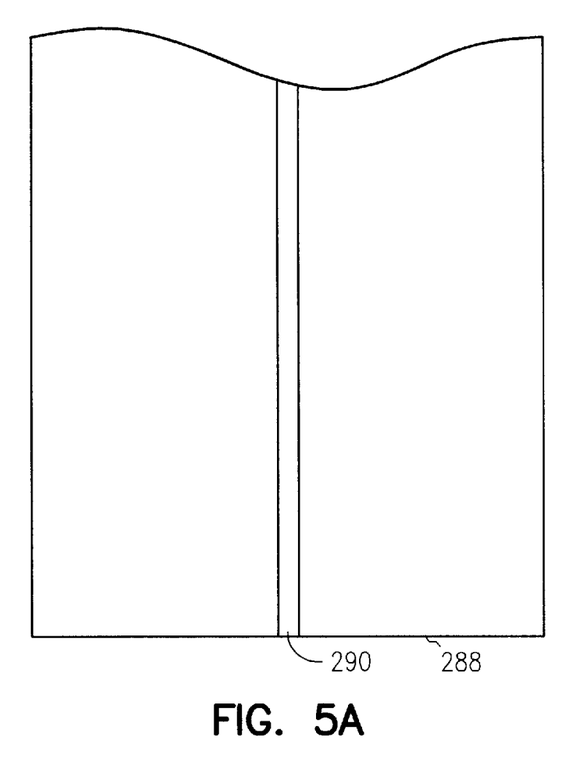
FIG. 5A is a top plan view illustrating a support device constructed in accordance with yet another embodiment.
Figure 5B:
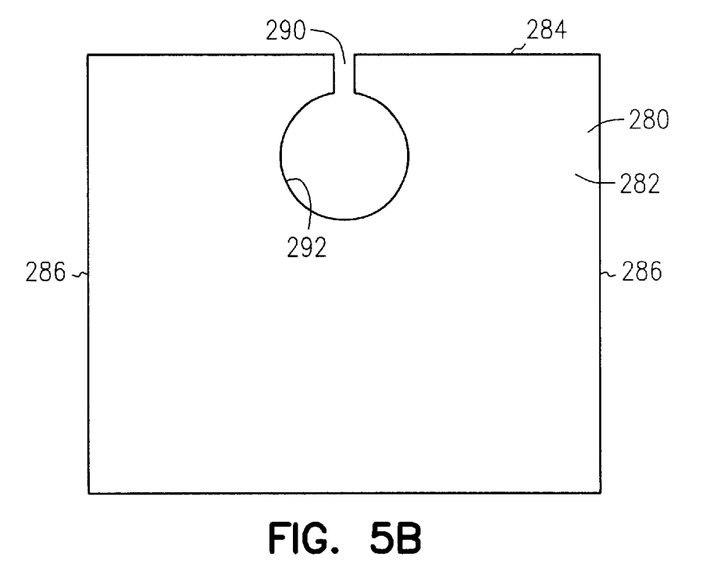
FIG. 5B is a side elevational view illustrating a support device constructed in accordance with another embodiment.

FIGS. 5A and 5B illustrate a support device 280, which is adapted to be installed on a roof structure (FIG. 7), and is adapted to support structures thereon. The support device 280 includes a support structure 282 which is adapted to support the structure.

In one embodiment, the support structure 282 is made of a pliable material, including, but not limited to, a weather resistant, pliable material. In another option, the support structure 282 comprises flame retardant material. The pliable material advantageously provides a visual indicator as to whether the support structure 282 has been consumed. The material has, optionally, a resilience which provides a cushioning effect when compressed. In one embodiment, the support structure 282 comprises a closed cell polyethylene foam material, for example that which is marketed as Dow BK-200.

The support device 280 includes a top surface 284, side surfaces 286, and an end surface 288. Disposed within the top surface 284 of the support device 280 is a slit 290. The slit 290 extends between the top surface 284 and a cut out 292. In one option, the cut out 292 has a circular cross-section and is sized to receive an elongate structure such as piping therein. In another option, the slit 290 comprises an opening, which eases the placement of the structure, such as piping, into the cut out 292.

Figure 6A:
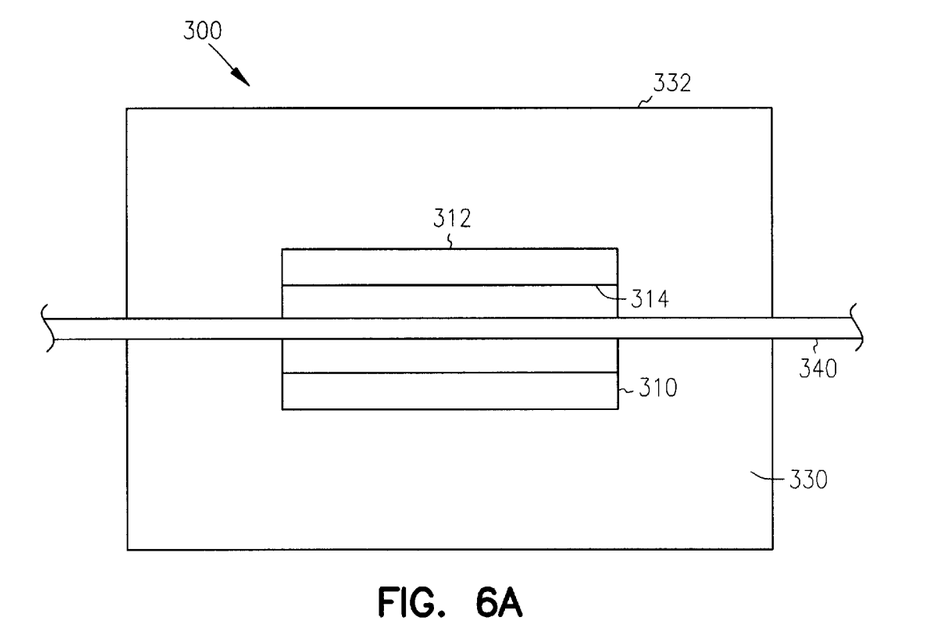
FIG. 6A is a top plan view illustrating a support device constructed in accordance with yet another embodiment.
Figure 6B:
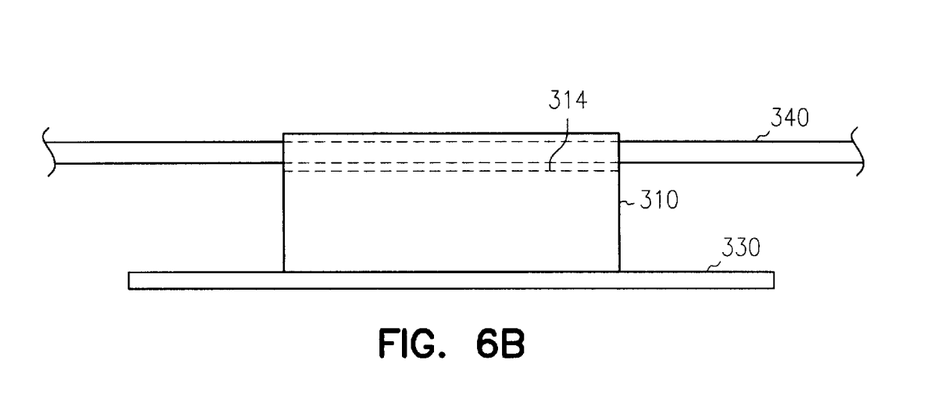
FIG. 6B is a side elevational view illustrating a support device constructed in accordance with one embodiment.

Referring to FIGS. 6A and 6B, a support device 300 is provided which includes a support structure 310 and a plate 330, where the support structure 310 is slidingly received on the plate 330. In one embodiment, the support structure 310 is made of a pliable material, including, but not limited to, a weather resistant, pliable material. The material has, optionally, a resilience which provides a cushioning effect when compressed. In one embodiment, the support structure comprises a closed cell polyethylene foam material, for example that which is marketed as Dow BK-200. The support structure optionally includes a recess therein.

The support structure 310 is defined by a first footprint 312 and the plate 330 is defined by a second footprint 332, where the second footprint 332 is substantially greater than the first footprint 312. The support structure 310 optionally comprises any of the above discussed embodiments. Elongate structures 340, such as piping, are placed directly on the support structure. In another option, the support structure 310 includes a depression 314 therein, where the elongate structures 340 are disposed within the depression 314.

Figure 7:
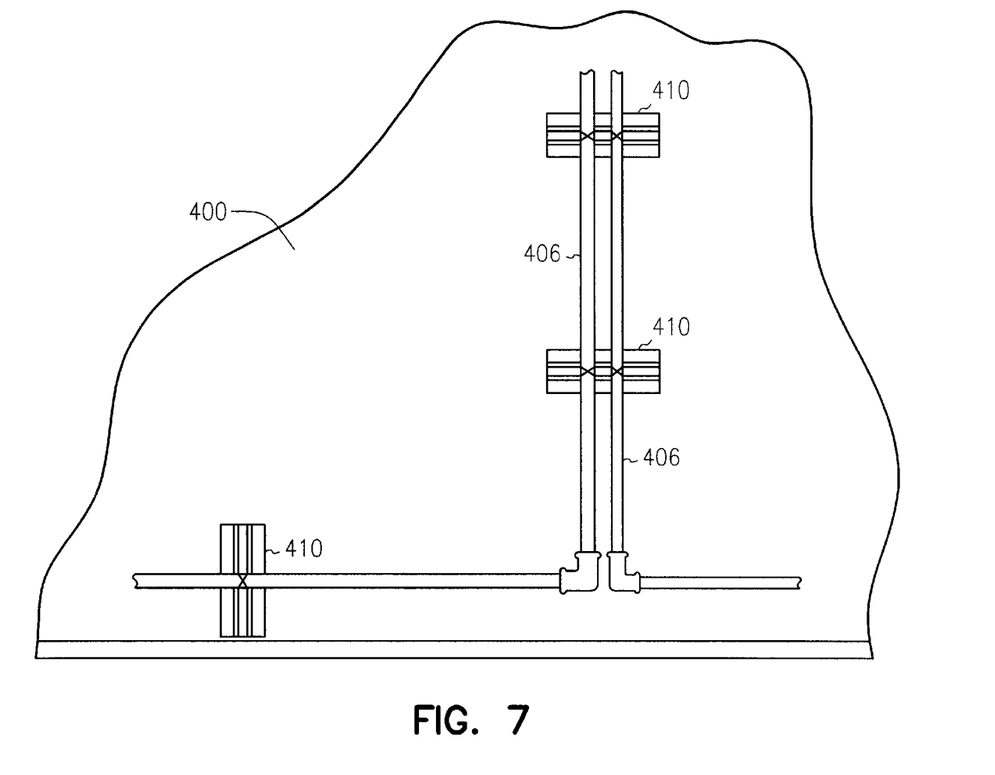
FIG. 7 is a top plan view of a plurality of support devices on a rooftop in accordance with one embodiment.
Figure 8:
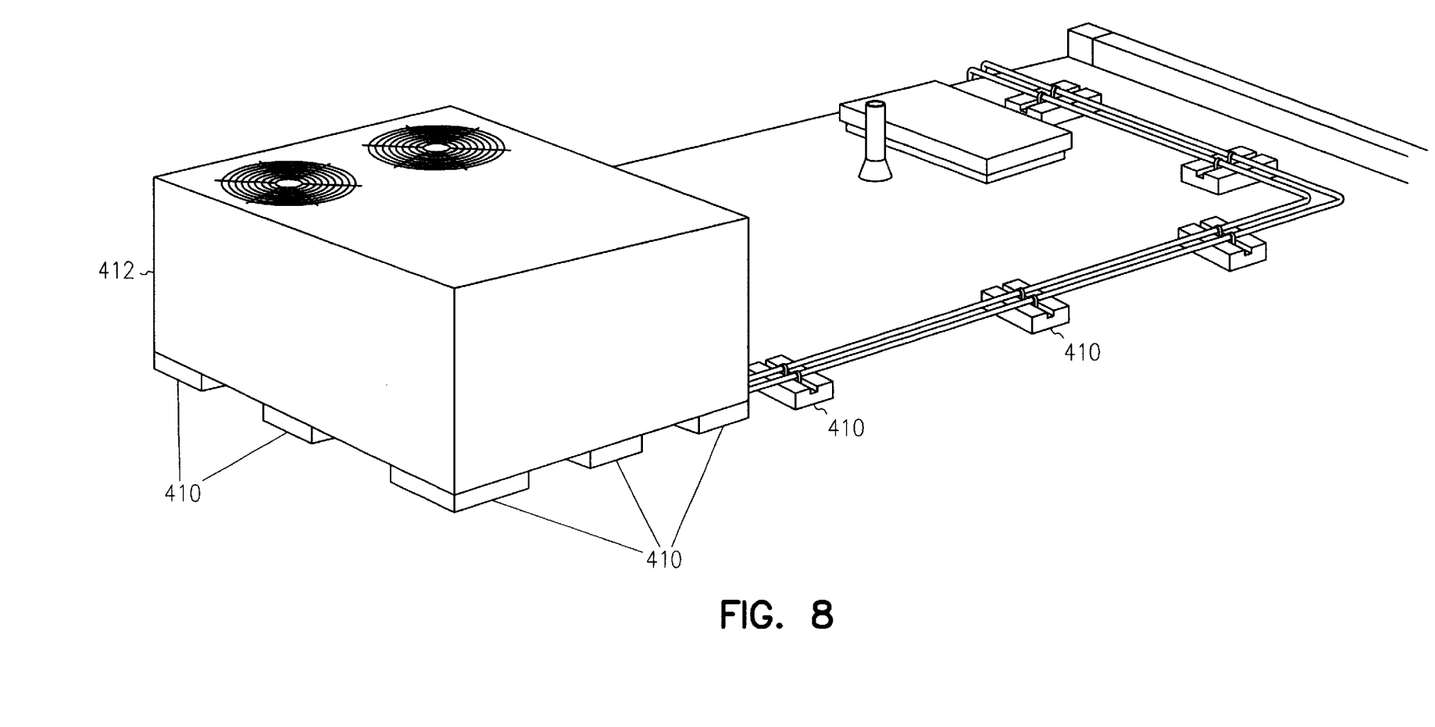
FIG. 8 is a perspective view of a plurality of support devices on a rooftop in accordance with another embodiment.

FIG. 7 illustrates a plurality of support devices 410 installed on a roof 400 of a building. The support devices 410 include those discussed above, and the accompanying drawings. The support devices 410 are mounted spaced apart from one another to distribute the weight of the pipes or other elongate structures 406 on the roof 400. Each of the support devices 410 optionally has one or more elongate structures 406, such as pipes, secured thereto to support a system of elongate structures as needed. In another option, as shown in FIG. 8, the support devices 410 are used to support an air conditioning unit 412 on the roof 400.

Figure 9:
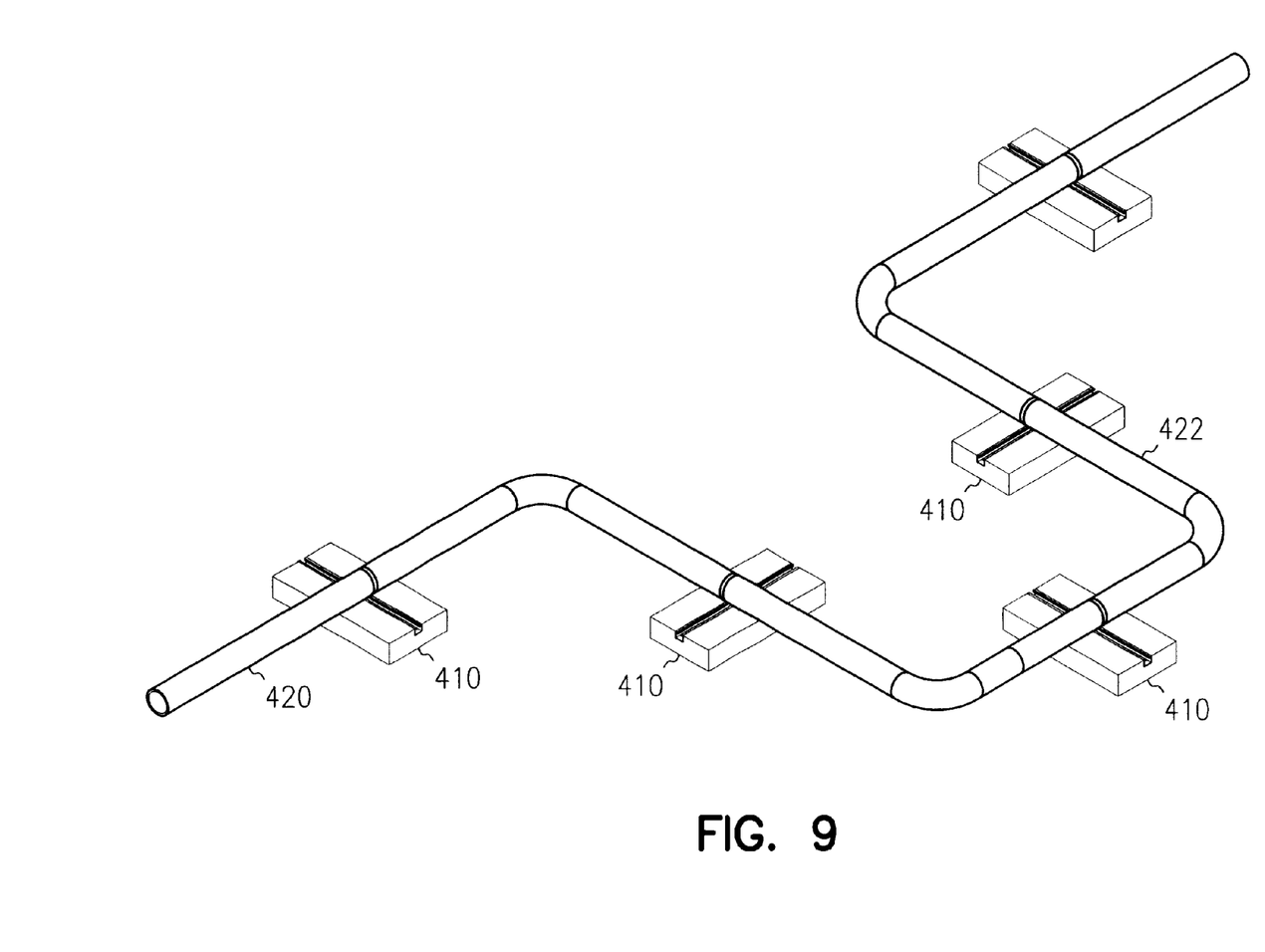
FIG. 9 is a perspective view of a plurality of support devices in accordance with another embodiment.

FIGS. 9–13 illustrate other variations for installations of support devices 410. For instance, as shown in FIG. 9, a plurality of support devices 410 which are placed to support piping 420. The piping 420 includes an expansion loop 422 which allows for the piping 420 to further expand and contract without damage to the piping 420.

Figure 10:
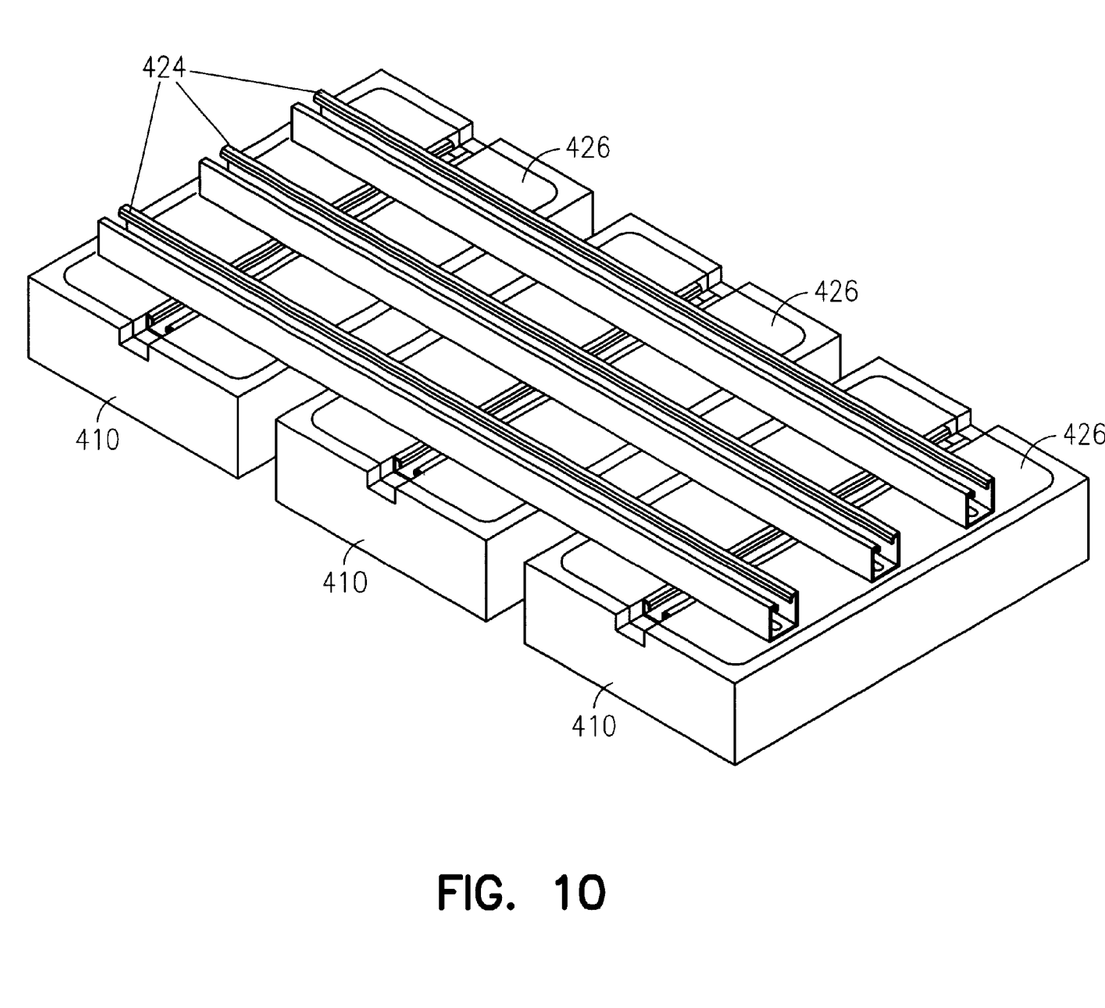
FIG. 10 is a perspective view of a plurality of support devices in accordance with another embodiment.
Figure 11:
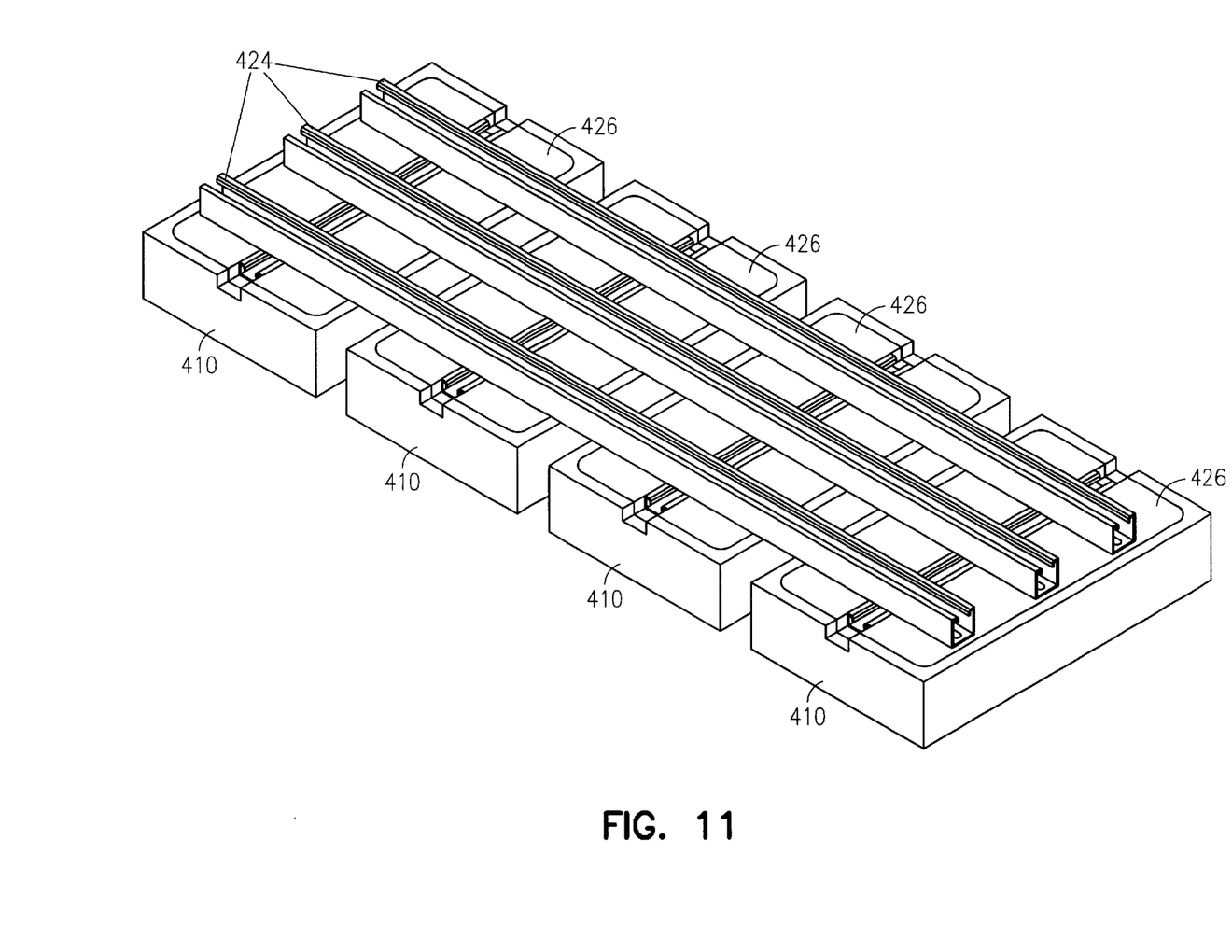
FIG. 11 is a perspective view of a plurality of support devices in accordance with another embodiment.

FIGS. 10 and 11 illustrate other variations for installation of the support devices 410. For installation involving the support of heavier devices, such as air conditioning units, multiple support devices can be placed directly adjacent to one another. For example, three support devices 410 (FIG. 10) or four support devices 410 (FIG. 11) are disposed adjacent to one another. One or more struts 424 are disposed on flat plates 426 of the support devices 410. The struts 424 are coupled with the plates 426, for example, by welding. Clamps are coupled with the struts 424, and are coupled with the struts 424, and are used to secure elongate structures thereon.

Figure 12:
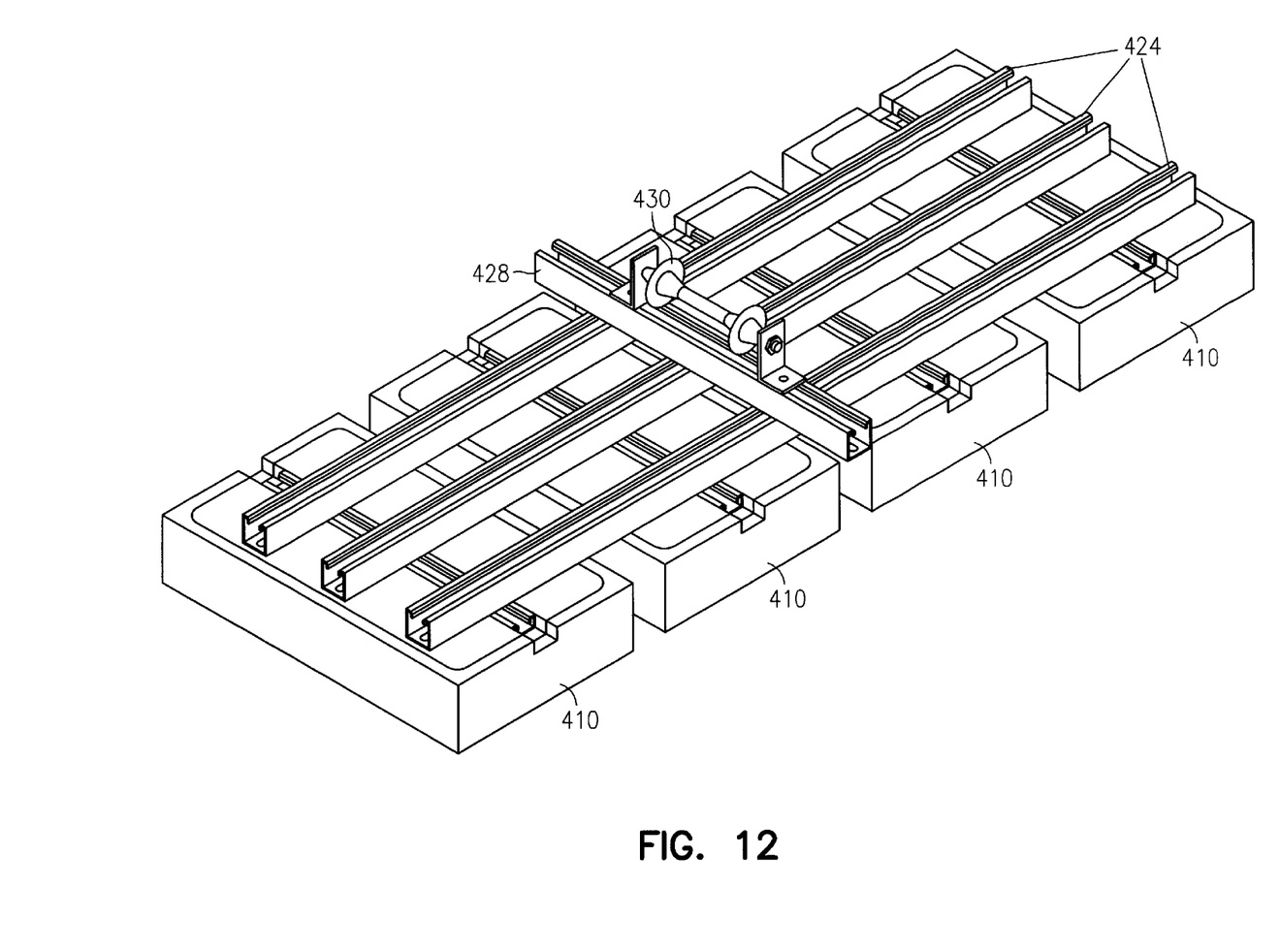
FIG. 12 is a perspective view of a plurality of support devices in accordance with another embodiment.

FIG. 12 illustrates another configuration of support devices 410 which are disposed directly adjacent to one another, or near one another. One or more struts 424 are disposed on the plates 426. Disposed across the struts 424, for example, in a transverse direction to the struts 424, is one or more second set of struts 428. Coupled with the second set of struts 428 is a roller 430, which provides for further diversity in the types of components which can be mounted thereon. In addition, the roller 430 allows for further movement for structures mounted thereon.

Figure 13:
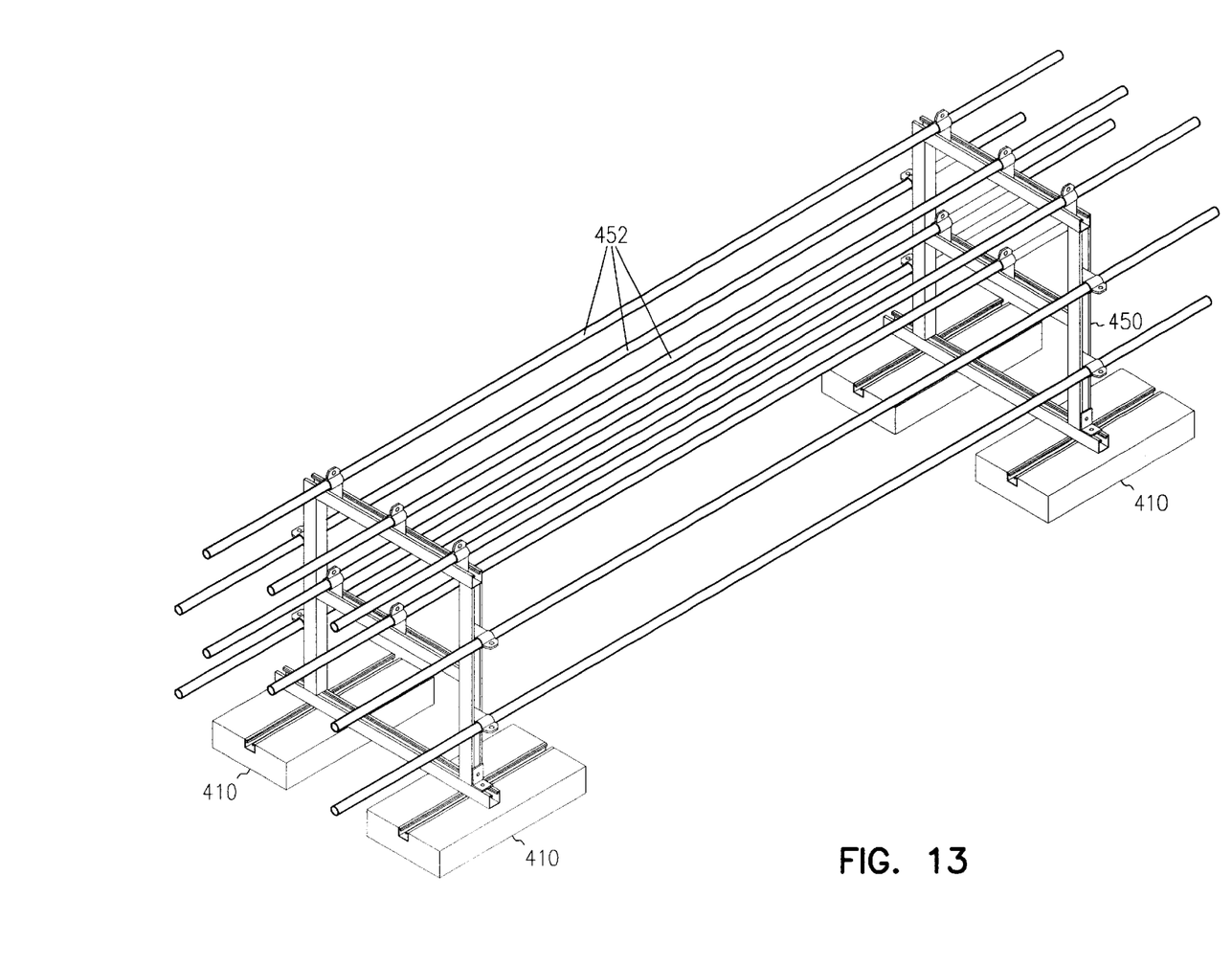
FIG. 13 is a perspective view of a plurality of support devices in accordance with another embodiment.

Referring to FIG. 13, support devices 410 are shown disposed near other support devices 410. Coupled with the support devices 410 are vertical extension members 450 and elongate structures 452 coupled thereto. Using the vertical extension members 450 allows for additional elongate structures 452 to be mounted within a footprint.

The support device can be used as a roof mounting system Alternatively, the mounting system can be employed in a variety of mounting applicants, including internal mounting or attic mounting. The mounting system can be used for a number of different pluming, electrical, and duct mounting applications. Further options include differing the dimensions of the base. Further optimal configurations include various clamps in conjunction with a variety of support structure materials.

Advantageously, the support device is adapted to support elongate structures which are more heavy than ordinary elongate structures. A further benefit is that the support structure provides a visual indicator if the support structure needs to be replaced. The support structure allows for elongate structures to be mounted on slightly irregular surfaces, and is durable and resilient to harsh weather conditions. Further, the support device provides lateral mounting flexibility and support for the elongate structures, and the elongate structures are allowed to freely change position without damaging the mounting surface, such as a rooftop membrane.

It is to be understood that the above description is intended to be illustrative, and not restrictive. It should be noted that features of the various above-described embodiments may be interchanged to form additional combinations. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A support device adapted to support structures, the support device comprising:
    a support structure having a recess therein;
    a rigid plate having a depression therein, the plate disposed on and coupled with the support structure, where the depression of the plate is disposed at least partially within the recess; and
    wherein the support structure comprises a pliable support structure.

2. A support device adapted to support structure, the support device comprising:
    a support structure having a recess therein;
    a rigid having a depression therein, the plate disposed on and coupled with the support structure, where the depression of the plate is deposed at least partially within the recess; and
    at least one elongate strut disposed within the depression of the plate, where the elongate strut is coupled to the plate; and
    wherein the support structure comprises foam.

3. The support device as recited in claim 1, wherein the at least one strut is spot welded to the plate.

4. The support device as recited in claim 1, wherein the plate comprises 16 gage sheet metal.

5. The support device as recited in claim 1, wherein the plate is defined in part by four corners, wherein each corner is rounded.

6. The support device as recited in claim 1, wherein the plate has at least one notch therein, the at least one notch disposed adjacent to the depression.

7. The support device as recited in claim 1, wherein the depression is defined by a first length, and the strut is defined by a secondary lengths and the first length is longer than the second length.

8. A support device adapted to support structures, the support device comprising:
    a support structure having a recess therein;
    a rigid plate having a depression therein, the plate disposed on and coupled with the support structure, where the depression of the plate is disposed at least partially within the recess; and
    at least one elongate strut disposed within the depression of the plate, where the elongate strut is coupled to the plate; and
    wherein the support structure is defined by a first footprint and the plate is defined by a second footprint, and the first footprint is greater than the second footprint.

9. A support device comprising:
    a foam support structure having an elongate depression therein, the elongate depression defined by a first profile, the elongate depression adapted to receive and support an elongate structure therein, the foam support structure configured to be mounted on a rooftop surface; and
    a plastic liner disposed within the elongate depression of the support structure the plastic liner defined by a second profile including an upper support surface and a lower surface, the upper support surface adapted to receive and support an elongate structure directly thereon.

10. The support device as recited in claim 9, wherein the lower surface of the liner has a substantially similar cross-section as the elongate depression.

11. The support device as recited in claim 9, wherein the lower surface of the liner has a substantially different cross section as the elongate depression.

12. The support device as recited in claim 9, wherein the liner has a substantially semi-cylindrical cross-section.

13. A support device comprising:
- a plastic support plate adapted to be disposed on a roof surface, the plastic support plate defined by a first footprint;
- a foam support structure slidably disposed on the plastic support plate, the foam support structure defined by a second footprint, where the first footprint is substantially larger than the second footprint;
- the foam support structure is adapted to receive an elongate structure directly thereon, and the foam support structure supports the elongate structure.

14. The support device as recited in claim 13, wherein the foam comprises closed cell polyethylene foam.

15. The support device as recited in claim 13, wherein the foam comprises a visual indicator adapted to visually indicate consumption of the support device.

16. The support device as recited in claim 13, wherein the foam has a depression therein, and the structure is adapted to be received within the depression.

17. A support device adapted to support structures, the support device comprising:
- a support structure having a recess therein, the support structure comprising foam;
- a rigid plate having a depression therein, the plate disposed on and coupled with the support structure, where the depression of the plate is disposed at least partially within the recess of the support, the plate defined by one or more corners, wherein one or more corners is rounded, the plate having at least one notch therein, the at least one notch disposed adjacent to the depression;
- the support structure is defined by a first foot print and the plate is defined by a second footprint, and the first footprint is substantially the same as the second footprint; and
- at least one elongate strut disposed within the depression of the plate, where the clongate strut is coupled to the plate.

* * * * *

UNITED STATES PATENT AND TRADEMARK OFFICE
CERTIFICATE OF CORRECTION

PATENT NO.   : 6,679,461 B1  
DATED         : January 20, 2004  
INVENTOR(S)  : Hawkins Page 1 of 1

It is certified that error appears in the above-identified patent and that said Letters Patent is hereby corrected as shown below:

Column 8,  
Line 9, insert -- at least one elongate strut disposed within the depression of the plate, where the elongate strut is coupled to the plate; and -- before "wherein".  
Line 11, delete "structure" and insert -- structures --, therefor.  
Line 16, delete "deposed" and insert -- disposed --, therefor.  
Line 33, delete "lengths" and insert -- length, --, therefor.  
Line 57, after "structure" insert -- , --.

Column 10,  
Line 18, delete "clongate" and insert -- elongate --, therefor.

Signed and Sealed this

Fourth Day of May, 2004

JON W. DUDAS  
*Acting Director of the United States Patent and Trademark Office*